US012657010B2

(12) United States Patent (10) Patent No.: US 12,657,010 B2
Schneuwly et al. (45) Date of Patent: Jun. 16, 2026

(54) DOC4CODE—AN AI-DRIVEN DOCUMENTATION RECOMMENDER SYSTEM TO AID PROGRAMMERS

(71) Applicant: Oracle International Corporation, Redwood Shores, CA (US)

(72) Inventors: Arno Schneuwly, Effretikon (CH); Saeid Allahdadian, Vancouver (CA); Pritam Dash, Vancouver (CA); Matteo Casserini, Zurich (CH); Felix Schmidt, Baden-Dattwil (CH); Eric Sedlar, Portola Valley, CA (US)

(73) Assignee: Oracle International Corporation, Redwood Shores, CA (US)

(*) Notice: Subject to any disclaimer, the term of this patent is extended or adjusted under 35 U.S.C. 154(b) by 326 days.

(21) Appl. No.: 18/202,756

(22) Filed: May 26, 2023

(65) Prior Publication Data

US 2024/0345811 A1 Oct. 17, 2024

Related U.S. Application Data

(60) Provisional application No. 63/459,421, filed on Apr. 14, 2023.

(51) Int. Cl.
*G06F 8/36* (2018.01)
*G06F 16/955* (2019.01)
*G06F 40/40* (2020.01)

(52) U.S. Cl.
CPC .............. *G06F 8/36* (2013.01); *G06F 16/955* (2019.01); *G06F 40/40* (2020.01)

(58) Field of Classification Search
CPC ........... G06F 8/36; G06F 16/955; G06F 40/40
See application file for complete search history.

(56) References Cited

U.S. PATENT DOCUMENTS 7,293,008 B2 11/2007 Potter
9,495,398 B2 11/2016 Parkkinen
(Continued)

OTHER PUBLICATIONS

Rose, Stuart et al., "Automatic Keyword Extraction from Individual Documents", Apr. 2010, pp. 1-20.
(Continued)

*Primary Examiner* — Marina Lee
(74) *Attorney, Agent, or Firm* — Hickman Becker Bingham Ledesma LLP

(57) ABSTRACT

Herein for each source logic in a corpus, a computer stores an identifier of the source logic and operates a logic encoder that infers a distinct fixed-size encoded logic that represents the variable-size source logic. At build time, a multidimensional index is generated and populated based on the encoded logics that represent the source logics in the corpus. At runtime, a user may edit and select a new source logic such as in a text editor or an integrated development environment (IDE). The logic encoder infers a new encoded logic that represents the new source logic. The multidimensional index accepts the new encoded logic as a lookup key and automatically selects and returns a result subset of encoded logics that represent similar source logics in the corpus. For display, the multidimensional index may select and return only encoded logics that are the few nearest neighbors to the new encoded logic.

20 Claims, 5 Drawing Sheets

(56) References Cited

U.S. PATENT DOCUMENTS

| | | | | |
|---|---|---|---|---|
| 11,656,851 B2 * | 5/2023 | Clement | ............... | G06N 3/045 |
| | | | | 717/106 |
| 11,740,879 B2 * | 8/2023 | Huang | .................. | G06F 40/279 |
| | | | | 715/762 |
| 12,073,195 B2 * | 8/2024 | Duan | .................... | G06F 40/274 |
| 12,130,809 B2 * | 10/2024 | Miller | ............... | G06F 16/24534 |
| 2013/0074036 A1 | 3/2013 | Brandt | | |
| 2016/0253500 A1 | 9/2016 | Alme | | |
| 2018/0075349 A1 | 3/2018 | Zhan | | |
| 2019/0073404 A1 | 3/2019 | Klouche | | |
| 2020/0097261 A1 | 3/2020 | Smith | | |
| 2020/0249918 A1 | 8/2020 | Svyatkovskiy | | |
| 2020/0349052 A1 | 11/2020 | Wehr | | |
| 2021/0132913 A1 | 5/2021 | Singh | | |
| 2023/0236811 A1 | 7/2023 | Sundaresan | | |
| 2023/0273776 A1 | 8/2023 | Wang | | |
| 2023/0376743 A1 | 11/2023 | Nikolic | | |
| 2024/0028740 A1 | 1/2024 | Chan | | |
| 2024/0086164 A1 * | 3/2024 | Kramer | ..................... | G06F 8/36 |
| 2024/0127112 A1 | 4/2024 | Ziegler | | |
| 2024/0134614 A1 * | 4/2024 | Bakshi | ...................... | G06F 8/65 |
| 2024/0289606 A1 | 8/2024 | Wang | | |
| 2024/0345815 A1 * | 10/2024 | Dash | ........................ | G06F 8/427 |

OTHER PUBLICATIONS

Campos, Ricardo et al., "YAKE! Keyword Extraction from Single Documents using Multiple Local Features", Information Sciences, 509, 2020, 257-289.

Zheng, Qinkai, et al., "A Multilingual Code Generation Tool—CodeGeeX", https://codegeex.ai/, 2023, 8pgs.

Johnson, Jeff, et al., "Billion-scale similarity search with GPUs", https://arxiv.org/pdf/1702.08734.pdf, Feb. 28, 2017, 12pgs.

Feng, Zhangyin, et al., "CodeBERT: A Pre-Trained Model for Programming and Natural Languages", Findings of the Assoctn for Computnl Linguistics: EMNLP 2020, pp. 1536-1547, https://doi.org/10.18653/v1/2020.findings-emnlp.139, Nov. 16, 2020, 12pgs.

Chen, Mark, et al., "Evaluating Large Language Models Trained on Code", https://arxiv.org/abs/2107.03374, Jul. 14, 2021, 35pgs.

"Tabnine is an AI assistant that speeds up delivery and keeps your code safe," Tabnine Ltd., https://www.tabnine.com/, 2023, 9pgs.

"Stack Overflow—Where Developers Learn, Share, & Build Careers", Stack Exchange Inc., https://stackoverflow.com/, 2023, 13pgs.

"Stack Exchange Data Dump: Stack Exchange, Inc.", https://archive.org/details/stackexchange, 2023, 8pgs.

"Sourcery—Automatically Improve Code Quality", https://sourcery.ai/, 2023, 14pgs.

"Github copilot", GitHub Inc. https://github.com/features/copilot, 2023, 16pgs.

"GitHub Copilot litigation", Joseph Saveri Law Firm, https://githubcopilotlitigation.com/, 2023, 4pgs.

"ChatGPT: Optimizing Language Models for Dialogue", GOpenAI, LLC, https://chat.openai.com/, 2023, 1pg.

Zugner, Daniel, et al., "Language-Agnostic Representation Learning of Source Code from Structure and Context", ICLR 2021, https://arxiv.org/abs/2103.11318, Mar. 21, 2021, 22pgs.

Zeng, Jie, et al., "Fast Code Clone Detection Based on Weighted Recursive Autoencoders", IEEE Access, vol. 7; pp. 125062-125078, 2019. doi: 10.1109/ACCESS.2019.2938825, published Sep. 2, 2019, 17pgs.

White, Martin, et al., "Deep Learning Code Fragments for Code Clone Detection", 31st IEEE/ACM ICASE 2016, dx.doi.org/10.1145/2970276.2970326, pp. 87-98, publ Aug. 25, 2016, 12pgs.

Wang, Xin, et al., "SynCoBERT: Syntax-Guided Multi-Modal Contrastive Pre-Training for Code Representation", https://arxiv.org/abs/2108.04556, Sep. 9, 2021, 9pgs.

Jiang, Lingxiao, et al., "Deckard: Scalable and Accurate Tree-based Detection of Code Clones", 29th ICSE '07, doi: 10.1109/ICSE.2007.30, pp. 96-105, May 24, 2007, 10pgs.

Guo, Daya, et al., "UniXcoder: Unified Cross-Modal Pre-training for Code Representation", https://arxiv.org/abs/2203.03850, Mar. 8, 2022, 14pgs.

Gao, Yi, et al., "TECCD: A Tree Embedding Approach for Code Clone Detection", 2019 IEEE CSME, doi: 10.1109/ICSME.2019.00025, pp. 145-156, 2019, 12pgs.

Feng, Zhangyin, et al., "CodeBERT: A Pre-Trained Model for Programming and Natural Languages", https://arxiv.org/abs/2002.08155, Feb. 19, 2020, 10pgs.

Fang, Chunrong, et al., "Functional code clone detection with syntax and semantics fusion learning", Proc of the 29th ACM SIGSOFT ISSTA '20, pp. 516-527, doi: 10.1145/3395363.3397362, Jul. 18, 2020, 12pgs.

Devlin, Jacob, et al., "BERT: Pre-training of Deep Bidirectional Transformers for Language Understanding", https://arxiv.org/abs/1810.04805, Oct. 11, 2018, 14pgs.

Bojanowski, Piotr, et al., "Enriching Word Vectors with Subword Information", https://arxiv.org/abs/1607.04606v1, Jul. 15, 2016, 7pgs.

"Hugging face: Build, train and deploy state of the art models powered by the reference open source in machine learning", https://huggingface.co, downloaded May 5, 2023, 11pgs.

"Fasttext: Library for efficient text classification and representation learning", https://fasttext.cc/, downloaded May 5, 2023, 5pgs.

Prompting Large Language Model for Machine Translation-A Case Study, Biao et al., (Year: 2023).

Prompting a Large Language Model to Generate Diverse Motivational Messages, Samuel et al., (Year: 2023).

Error Analysis Prompting Enables Human-Like Translation Evaluation in Large Language Models—A Case Study on ChatGPT, Qingyu Lu (Year: 2023).

* cited by examiner

FIG. 2

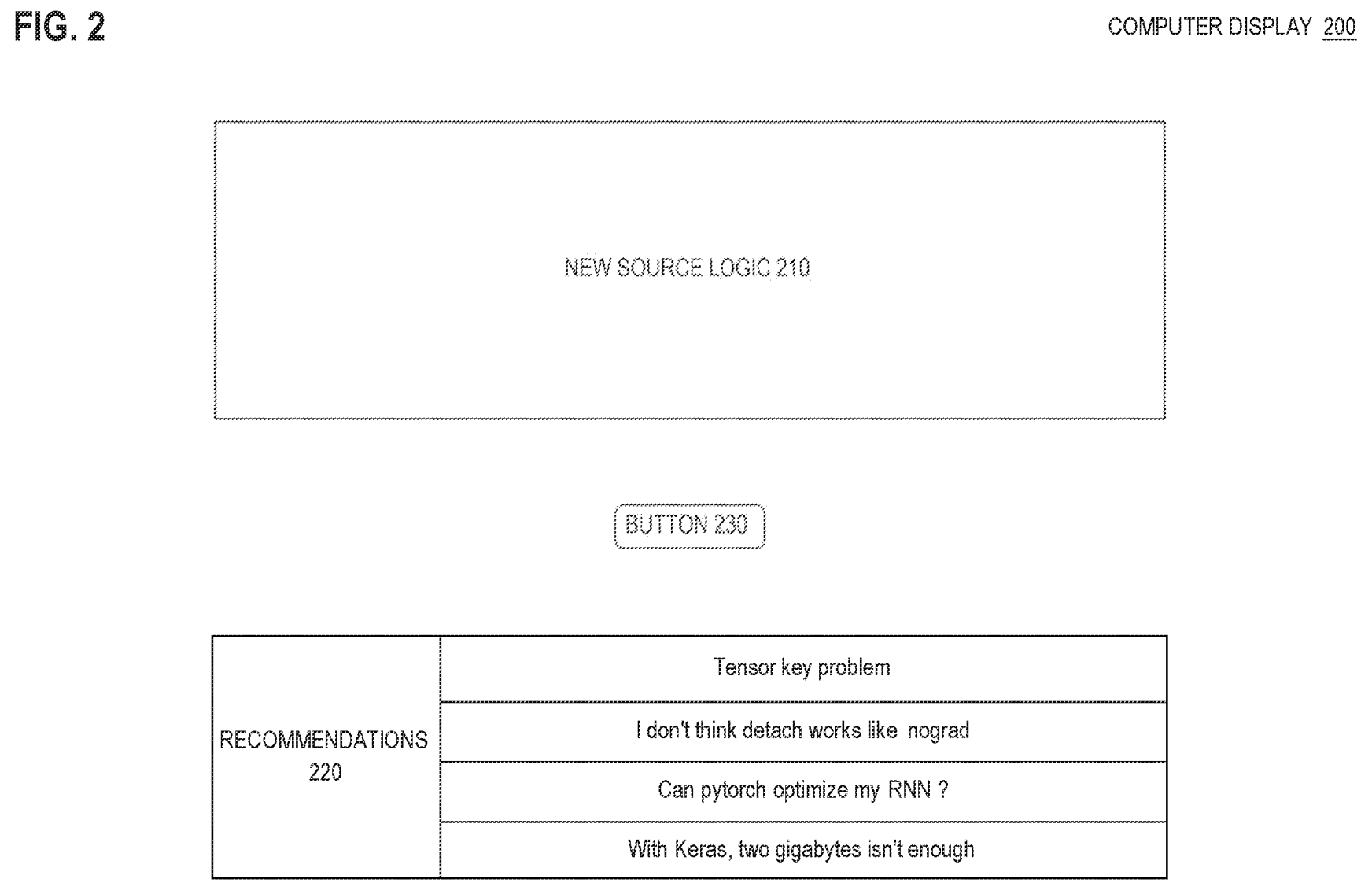

COMPUTER DISPLAY  200

NEW SOURCE LOGIC 210

BUTTON 230

RECOMMENDATIONS 220

Tensor key problem

I don't think detach works like nograd

Can pytorch optimize my RNN ?

With Keras, two gigabytes isn't enough

FIG. 3

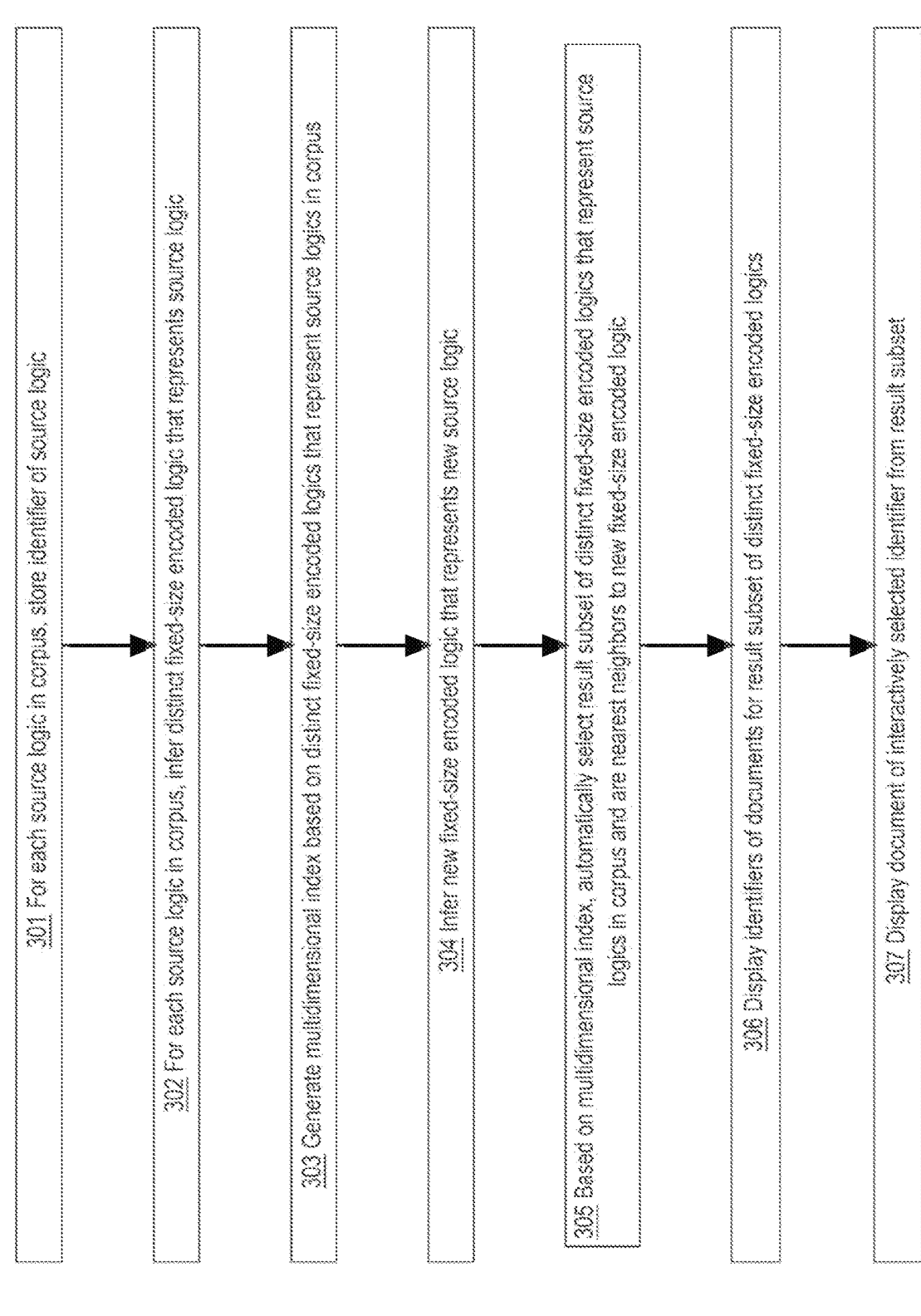

301 For each source logic in corpus, store identifier of source logic

302 For each source logic in corpus, infer distinct fixed-size encoded logic that represents source logic 303 Generate multidimensional index based on distinct fixed-size encoded logics that represent source logics in corpus 304 Infer new fixed-size encoded logic that represents new source logic 305 Based on multidimensional index, automatically select result subset of distinct fixed-size encoded logics that represent source logics in corpus and are nearest neighbors to new fixed-size encoded logic 306 Display identifiers of documents for result subset of distinct fixed-size encoded logics 307 Display document of interactively selected identifier from result subset

SOFTWARE SYSTEM 500

502A
APPLICATION PROGRAM 1

502B
APPLICATION PROGRAM 2

502C
APPLICATION PROGRAM 3

[...]

502N
APPLICATION PROGRAM N

502

510
OPERATING SYSTEM
(e.g., WINDOWS, UNIX, LINUX, MAC OS, IOS, ANDROID, OR LIKE)

515
GRAPHICAL USER INTERFACE (GUI)

530
VIRTUAL MACHINE MONITOR (VMM)

BARE HARDWARE (e.g., COMPUTING DEVICE 400)

DOC4CODE—AN AI-DRIVEN DOCUMENTATION RECOMMENDER SYSTEM TO AID PROGRAMMERS

CROSS-REFERENCE TO RELATED APPLICATION; BENEFIT CLAIM

This application claims the benefit of Provisional Application 63/459,421, filed Apr. 14, 2023, the entire contents of which is incorporated by reference under 35 U.S.C. § 119 (e).

FIELD OF THE INVENTION

The present invention relates to natural language processing (NLP). Herein is dynamic and contextual recommendation of reference documentation based on similarity of fixed-size encodings of source logic snippets.

BACKGROUND

Software developers consume a considerable amount of documentation such as APIs, question-and-answer discussion websites, tutorials, and other knowledge bases to develop applications. A common entry point to consume such developer support documentation is major search engines. For example, finding high quality and up-to-date proprietary documentation through web search can be challenging. Search results are diluted with other content and often show outdated versions of proprietary documentation and guides. This problem also occurs with any public and versioned software stack and corresponding documentation.

State of the art natural language processing (NLP) provides generative functionality such as code completion for single lines and functions as well as natural language to code translations. The cognitive load on the user is high in the state of the art that requires direct user interaction for problem solving purposes. The approach herein is not generative and is more ergonomic because it expects less interaction than a generative approach.

BRIEF DESCRIPTION OF THE DRAWINGS

In the drawings:

FIG. 2 depicts a screenshot of an example computer display with recommendations based on similarity of source logics;

FIG. 3 is a flow diagram that depicts an example computer process that builds and uses a multidimensional index to generate recommendations to reference documentation for new source logic;

DETAILED DESCRIPTION

Figure 1:
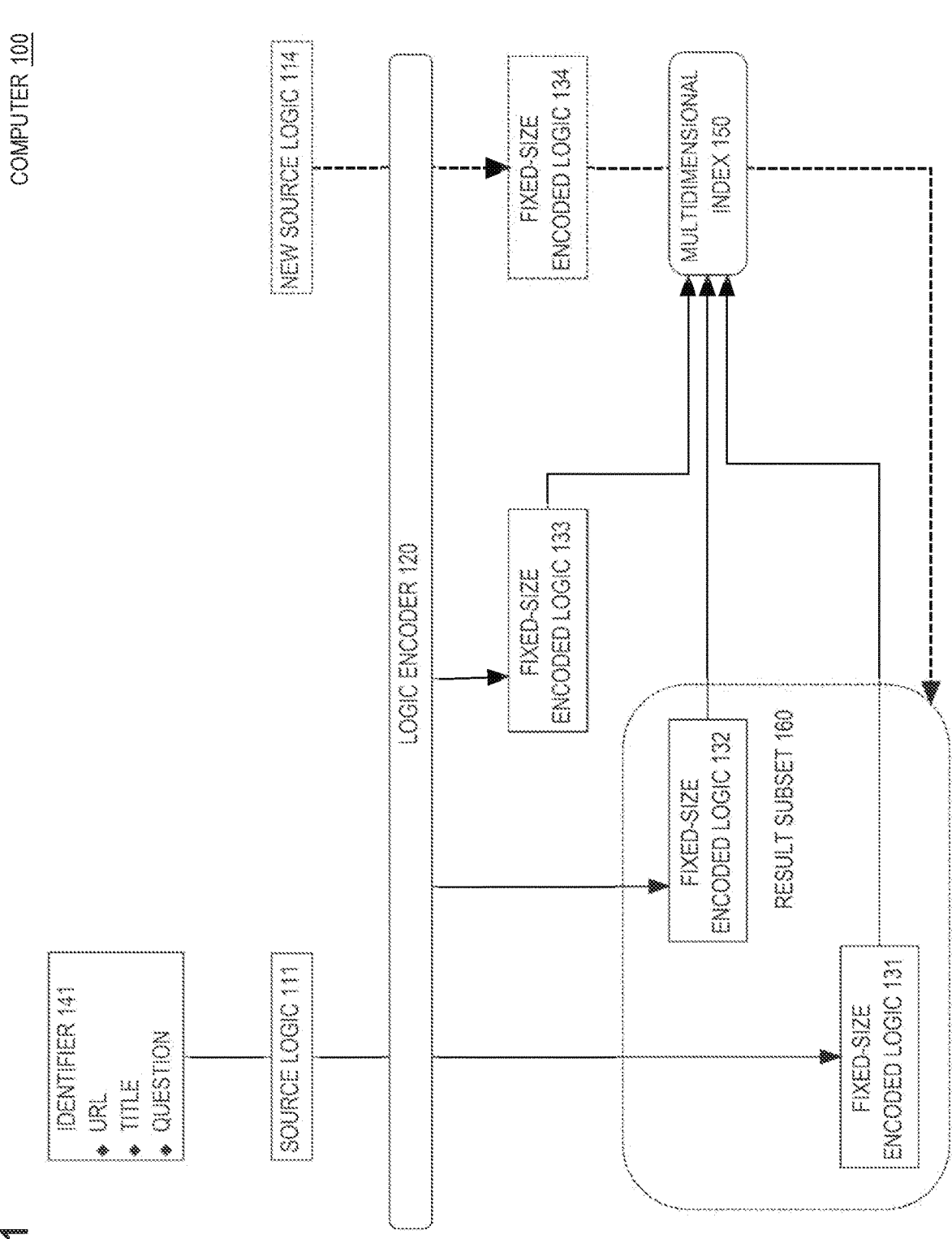
FIG. 1 is a block diagram that depicts an example computer that uses natural language processing (NLP) to generate dynamic and contextual recommendations of reference documentation based on similarity of fixed-size encodings of respective variable-sized source logics.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein is natural language processing (NLP) that dynamically generates contextual recommendations of reference documentation based on similarity of fixed-size encodings of source logic snippets. Other artificial intelligence (AI)-driven solutions for software development assistance generate code (i.e. logic) or code comments such as natural language prose. Here is tool doc4code, and its novel interactions with a user provides unprecedented passivity. Based on a code snippet being edited by a software developer, doc4code recommends documentation from software engineering knowledge bases such as a question-and-answer discussion website whose wide audience provides a network effect for highly focused and contextual technical expertise. Doc4code also recommends application program interface (API) documents, such as generated by JavaDoc or proprietary internal documentation tools. The recommended documents are reference materials that help the developer to access valuable information related to the code being currently written and related to textual output received from build and compilation systems. These knowledgebase references increase developer productivity and efficiency by reducing or avoiding manual and automatic use of search engines to obtain relevant information.

Doc4code is pluggable into any integrated development environment (IDE) and directly accesses text in documents and artifacts that contain engineering text such as source logic, comments, API documentation, console output, interactive selection, and a project source codebase having source files. In an IDE, doc4code also can scrape text from various windows and panels that display the engineering text, including a currently viewed or debugged source file, class, subroutine, lexical block, or statement. Moreover, the algorithm is capable of prioritization of certain document sources over others in order to selectively generate recommendations for increased accuracy (i.e. relevance).

This recommender system has three activities to implement a similarity search in a logic embedding space. First, source code embeddings are inferred for a corpus of existing code snippets. Second, a corpus dictionary is generated to associate documents that contain source code with the embeddings of the source code. Each code snippet represents a data point in a searchable embeddings space. Third, the embeddings space of source code snippets is automated with efficient search capabilities to find data points in the corpus that are similar to new logic being edited by a user. The system may have the following subsystems.

Source Code Representation: This represents the source code snippets in a vector space. In order to build a search index, a vector representation of the source code is used. Code and language models such as bidirectional encoder representations from transformers (BERT) may be used to generate semantic embeddings of logic.

Code and Documentation Corpus: This tracks which documents contain which code snippets and what are the vector embeddings of the snippets.

Search & Rank for Relevance: This finds and ranks suitable documents in the corpus that are related to a user's new code snippet. Since all code snippets in the corpus are embedded in a vector space, searching and ranking may be based on measured distances between embeddings to discover semantically similar documents in the corpus whose embeddings are nearest neighbors of the embedding of the user's new code.

In an embodiment, the language model is BERT that was originally designed for NLP. BERT is used herein as an encoder that infers a fixed-size vector from a variable size (e.g. token count) source logic. Herein, language models and, for example, BERT are applied to programming languages. Herein, code may be a mix of logic, comments, and console output such as standard output (stdout), standard error (stderr), and (e.g. live, tailed) diagnostic logs. For example, a live or historic stack trace of an exception that occurred in code may be available in diagnostic output that herein may accompany the code for learned inferencing.

This approach includes at least the following advantages.

Reduced usage of major search engines to access relevant user documentation: Traditionally, software developers access search engines to solve their problems. Doc4code points to the most relevant documents based on a given code snippet or codebase a software developer is working on.

Combination of internal and external knowledge bases in code and language models: Public knowledge-bases contain non-proprietary information. Internal documentation with important guidelines from engineering teams can be taken into account with doc4code.

Control over recommendations: if desired, company-owned documentation can be prioritized. For example, if a new version of Java or GraalVM is published the system may be tuned to rank documents for these tools higher.

No Generative Copyright Issues: Existing generative AI assistants may face copyright issues. Doc4code has a specialized search index for source code. Doc4code does not generate new source code.

An IDE integration of doc4code potentially reduces interactive switching between IDE and web browser windows. This increases the efficiency of coding by increasing focus time and almost eliminating the time needed for searching. The corpus of documents that contain code snippets may be enhanced with error codes and compiler messages to increase efficiency in interactive debugging of code and proactively analyzing code performance.

The language model may already be pretrained and fine-tuned to capture semantic code details when representing code in vector form compactly and accurately.

The amount of data and computation cost using this methodology is low.

Straightforward implementation of this framework.

Accelerated operation without a parser and without an abstract syntax tree (AST).

The approach herein includes at least the following innovations. Doc4code covers a gap between API autocompletion functionalities in IDEs and generative code models. Doc4code leverages the power of code models but instead of generating specific text lines, doc4code provides information to a software developer related to the source code being edited. This information is a collection of public and proprietary information linked to similar source code. The developer should be made aware of related topics, APIs and potential problems during the writing process in a non-intrusive way. Such a recommender system is unprecedented because:

1. In contrast to other AI code assistants doc4code does not actively generate new code for the developer but passively enriches the developer's context information.
2. Recommendations are generated with source code being edited. The scope of the code used to generate recommendations is modifiable according to the user's preferences. Example scope are lines, blocks, files or project-wide source code. A key difference from API autocompletion suggestions is that recommendations herein may contain authoritative or normative knowledge maintained by curation or mindshare (e.g. online discussion).
3. The totality of this application is novel. The state of the art has no application specifically built for this purpose. Herein are novel uses of code embedding models, search indexes, and similarity search. This novel framework is depicted in FIGS. 1 and 2.
4. Doc4code effectively relates the corpus to potential questions and problems a software engineer is or might be facing. This approach is unprecedented in AI assistants for code. State of the art AI assistants do poorly when asked to diagnose a bug (i.e. defect) or performance bottleneck in source code being edited.

In an embodiment, for each source logic in a corpus, a computer stores an identifier of the source logic and operates a logic encoder that infers a distinct fixed-size encoded logic that represents the variable-size source logic. At build time, a multidimensional index is generated and populated based on the encoded logics that represent the source logics in the corpus. At runtime, a user may edit and select a new source logic such as in a text editor or an integrated development environment (IDE). The logic encoder infers a new encoded logic that represents the new source logic. The multidimensional index accepts the new encoded logic as a lookup key and automatically selects and returns a result subset of encoded logics that represent relevant (i.e. similar) source logics in the corpus. For display, the multidimensional index may select and return only encoded logics that are the few nearest neighbors to the new encoded logic.

1.0 Example Computer

FIG. 1 is a block diagram that depicts an example computer 100 that uses natural language processing (NLP) to generate dynamic and contextual recommendations of reference documentation based on similarity of fixed-size encoded logics 131-134 of respective source logics such as source logics 111 and 114. Computer 100 may be one or more of a rack server such as a blade, a personal computer, a mainframe, or a virtual computer.

Computer 100 may define a corpus that locates over a million internal or external (i.e. remote) documents. Each document contains a source logic that is text such as a code snippet or a script, although the documents may have different file formats or multipurpose internet media extension (MIME) types. For example, a document may be a text file, a hypertext markup language (HTML) webpage, a word processor file, or other common document format.

1.1 Identifiers of Documents in Corpus

The corpus locates many documents, including a document that contains source logic 111, and computer 100 may extract all source logics from all documents in the corpus. Source logic 111 is text that contains one or more logic statements for a same formal computer language such as a scripting language such as python or JavaScript, or for a general purpose programming language such as C++ or Java. Source logic 111 may instead contain database statement(s) such as any of: structured query language (SQL), data manipulation language (DML), data query language (DQL), or data control language (DCL). As discussed later herein, new source logic 114 is not extracted from any document in the corpus.

Computer 100 generates or records metadata that may summarize, locate, and identify each document. For example, source logic 111 is automatically extracted from a document that is automatically discovered by computer 100 and then automatically declared by generating or extracting identifier 141.

The identifiers of all of the documents in the corpus may be stored in memory or in a database table. The structure and contents of identifier 141 depends on the implementation. Example contents of identifier 141 may include:

a uniform resource identifier (URI) such as a uniform resource locator (URL) that contains a web address of the document, which may be used by computer 100 to automatically retrieve and display the document, and the URI may uniquely identify the document, which may be a webpage;

a natural language title of the document; and in a tutorial or online discussion forum, a linguistic structure such as an answered question, and either the question or the answer may contain source logic 111.

1.2 Logic Encoder Infers Fixed-Size Encoded Logic

In an embodiment, logic encoder 120 is a multilayer artificial neural network (ANN). Each source logic extracted from a document in the corpus is tokenized into a variable-length sequence of lexical tokens that logic encoder 120 accepts as input. Logic encoder 120 was already pretrained to infer fixed-size encoded logic for input code of a particular programing language.

For example, logic encoder 120 accepts source logic 111 as input and infers fixed-size encoded logic 131 as output that represents variable-sized source logic 111. The corpus contains two other documents that provide two other source logics from which logic encoder 120 respectively infers fixed-size encoded logics 132-133.

1.3 Build Phase

The lifecycle of computer 100 may contain a sequence of a build phase followed by a probe (i.e. runtime) phase. Activities of the build phase are shown as solid arrows. Activities of the runtime (i.e. query) phase are shown as dashed arrows. Components 114, 134, and 160 are shown with a dashed outline to indicate that they do not operate at build time. For example, one computer may implement computer 100 while building and, later at runtime, a different computer may instead implement computer 100. In other words, there may be a build computer that is or is not reused as the runtime computer. Components 114, 134, and 160 may or may not be absent in the build computer. Components 111, 120, 131-133, 141, and 150 are shown with a solid outline to indicate that they operate in both phases.

1.4 Multidimensional Distance Measurement in Vector Space

The goal of building is to generate and populate multidimensional index 150. Each fixed-size encoded logic of any document in the corpus is a point in a vast multidimensional space that contains all of the points of the fixed-size encoded logics of all documents in the corpus. Each of the fixed-size encoded logics is a numeric feature vector, which is an array whose elements are numbers, and all of the fixed-size encoded logics have a same width (i.e. count of elements, features, or numbers).

If the width of the feature vector is a hundred features, then multidimensional index has a hundred dimensions, which is one dimension per feature. In an embodiment, multidimensional index 150 can measure a distance that is a Euclidean diagonal, Manhattan grid, or Mahalonobis statistical distance between any two points (i.e. feature vectors, fixed-size encoded logics). The fixed-size encoded logics are embeddings that are semantically correlated to the source logics they represent.

That is, the measured distance between two fixed-size encoded logics is inversely proportional to the similarity of the source logics they represent. In other words, the multidimensional space is a semantic space. In an embodiment, logic encoder 120 already learned the semantic space such as with an implementation of bidirectional encoder representations from transformers (BERT) that was originally designed for semantic analysis in NLP.

1.5 Multidimensional Index

Building is done when all documents in the corpus have had the fixed-sized encoded logics of their source logics populated into multidimensional index 150. At runtime, multidimensional index 150 may be treated as immutable (i.e. read only). At runtime, logic encoder 120 accepts new source logic 114 as input and infers fixed-size encoded logic 134 that represents new source logic 114. For example, new source logic 114 may currently be interactively edited in a text editor or integrated development environment (IDE). Multidimensional index 150 does not contain fixed-size encoded logic 134 because multidimensional index 150 was never populated with fixed-size encoded logic 134 at build time.

Multidimensional index 150 accepts fixed-size encoded logic 134 that represents new source logic 114 as input and returns result subset 160 of fixed-size encoded logics of source logics from documents in the corpus. In other words, multidimensional index 150 reacts to a new fixed-size encoded logic at runtime by returning a few of the fixed-size encoded logics that were used at build time. For example as shown, result subset 160 contains fixed-size encoded logics 131-132 but not 133.

1.6 Returned Result Subset and Corpus Dictionary

Multidimensional index 150 is configured to return result subset 160 that counts a predefined count of fixed-size encoded logics, such as best (i.e. top ranking, most relevant) few (e.g. twenty) fixed-size encoded logics. In an embodiment, multidimensional index 150 returns nearest neighbors that are indexed fixed-size encoded logics that have the least measured distance to new fixed-size encoded logic 134.

As discussed earlier herein at build time, computer 100 stores identifiers of all documents in the corpus such as identifier 141, and retains all identifiers for use at runtime. For example at build time, computer 100 may generate a corpus dictionary that is a bidirectional map that associates the identifier of each document in the corpus with the fixed-size encoded logic of the document. The corpus dictionary may be retained and used at runtime when any fixed-size encoded logic in result subset 160 may be used as a lookup key into the corpus dictionary to retrieve the associated identifier of the document that was used to generate the fixed-size encoded logic. Retention of the corpus dictionary that contains identifier 141 does not require retention of source logic 111 nor retention of the document that contains source logic 111.

For example, the corpus dictionary may accept fixed-size encoded logic 131 as a lookup key and return identifier 141. Details of identifiers may be shown when showing result subset 160. For example, result subset 160 may be displayed as a list, and each item in the list may show the title of the identifier, which is a title of a document such as a webpage or, in some embodiments, an item may show the question of the identifier. For example, identifier 141 contains a question and title extracted from the document.

1.7 Display and Interactivity of Result Subset

The displayed list may be a list of recommended reference documents that are likely to be highly relevant because they contain source logics that are semantically similar to new source logic 114 as indicated by the proximity of the indexed fixed-size encoded logics to new fixed-size encoded logic 134. Any item in the list that shows result subset 160 may be interactively selected such as clicked on with a pointer device such as a mouse.

For example if the selected item in the list corresponds to fixed-size encoded logic 131, then the URL of identifier 141 may be used to retrieve and display the document that contains source logic 111 that is similar to new source logic 114. If the user is dissatisfied with the displayed document, the user may further interact with computer 100 in any of the following ways. In one scenario, the user interactively selects a different item in the list to cause retrieval and display of a different document whose source logic is similar to new source logic 114.

1.8 Interactive Adjustment of New Source Logic Selection

In another scenario, the user instead selects a different new source logic. For example, the user may cause selection of a new source logic by interactively: narrowing or broadening the extent of selected text, repositioning the typing caret to a different line (e.g. statement) or lexical block, or multiselecting (i.e. one or more) non-textual (e.g. graphical) representations of source logic artifacts such as projects, files, classes, or subroutines, such as in an outline view or explorer view of an IDE. For example, new source logic 114 may be a few text lines (e.g. statements) that is only a portion of a subroutine, or new source logic 114 may be a lexical block such as a loop or a subroutine body that is only a portion of a source file.

Interactive adjustment of a selection may precede runtime processing of another new source logic to generate and display a different result subset for further interaction as discussed earlier herein. In various embodiments, a stack trace of an exception is used to automatically select a new source logic, and may or may not also be automatically concatenated onto the new source logic as input that logic encoder 120 accepts. For example as discussed earlier herein, a document may contain a question that contains a mostly similar or almost identical stack trace of a same kind of exception.

2.0 Example Computer Display

FIG. 2 depicts a screenshot of an example computer display 200 that may be an optional part of any computer herein. Computer display 200 is part of an integrated development environment (IDE) that contains a text editor that contains source logic being edited, including new source logic 210. For example, computer 100 of FIG. 1 may contain computer display 200, and may process new source logic 210 in a same way as new source logic 114.

The text editor may display more source logic, of which new source logic 210 may be a portion. For example, new source logic 210 may be an interactively selected subset of text lines in the displayed more source logic, or new source logic 210 may be a subroutine or lexical block that contains the typing caret of the text editor.

Interactively pressing button 230 causes generation and display of recommendations 220 that contains a (e.g. relevance ranked) list of four shown items. For example, recommendations 220 may be based on result subset 160 as returned by multidimensional index 150 for a new source logic as discussed for FIG. 1.

In various embodiments, generation and display of recommendations 220 is also caused by display or selection of a stack trace. Button 230 is exemplary, and may be replaced or supplemented with other interactive or automatic triggers such as a menu item or a compilation error such as a syntax parse error or a semantic error despite valid syntax of new source logic 210. For example, recommendations 220 may be generated even if new source logic 210 cannot parse or cannot compile. An individual recommendation in recommendations 220 may be interactively selected as discussed earlier herein.

As discussed above, new source logic 210 may be a selected portion of more source logic in the text editor. In an embodiment, the text editor and shown new source logic 210 may be two separate (e.g. side by side) panels, with new source logic 210 displaying whatever source logic is selected in another panel, such is in the text editor or an outline view or explorer view as discussed earlier herein. In that case, new source logic 210 may or may not be editable or contain an interactively adjustable selection of text. For example, new source logic 210 may contain editable text and the user can interactively delete irrelevant portions in new source logic 210, without affecting the more source logic in the text editor. Alternatively, new source logic 210 may be read only, but interactive selection of a portion of text in new source logic 210 may interactively exclude irrelevant portions in new source logic 210.

3.0 Example Building and Runtime Process

FIG. 3 is a flow diagram that depicts an example process that computer 100 may perform to build and use multidimensional index 150 to generate recommendations to reference documentation for new source logic 114, in an embodiment. As discussed earlier herein, the process of FIG. 2 is a sequence of a build phase that performs steps 301-303 followed by a runtime that performs steps 305-307, and the two phases may occur on a same or different computers.

For each source logic in the corpus, build step 301 stores the identifier of the source logic as discussed for FIG. 1. For example into memory or storage, step 301 may store identifier 141 for source logic 111. Step 301 builds the corpus dictionary as discussed for FIG. 1.

For each source logic in the corpus, in build step 302, logic encoder 120 infers distinct fixed-size encoded logic that represents the source logic as discussed for FIG. 1. For example, step 302 infers fixed-size encoded logic 131 from source logic 111. As discussed for FIG. 1, step 302 may tokenize source logic 111 into a token sequence that logic encoder 120 accepts as input.

Build step 303 generates and populates multidimensional index 150 based on distinct fixed-size encoded logics 131-133 that represent the source logics in all documents in the corpus as discussed for FIG. 1. In an embodiment, multidimensional index 150 is implemented with Facebook AI similarity search (FAISS), and step 303 may be implemented as a python script that instantiates in memory FAISS's IndexIVFFlat that is an inverted index of multidimensional vectors.

In a FAISS embodiment, step 303 may populate IndexIVFFlat by invoking its add ( ) method that accepts all of the corpus's fixed-size encoded logics 131-133 as a set of many input vectors. However, IndexIVFFlat does not store copies of the fixed-size encoded logics, but instead uses a more compact and accelerated internal representation of the dimensions of the multidimensional input vectors.

Between build time and runtime, deployment into a production (i.e. runtime) environment may occur. In that case in the FAISS embodiment, invoking IndexIVFFlat's write_index( ) method generates a single index file that contains a serialization of multidimensional index 150 that may be copied into production and deserialized to generate a prepopulated identical instance of multidimensional index 150. That is, the runtime instance of multidimensional index 150 may be an identical clone of the instance of multidimensional index 150 built by step 303, even if build time and runtime are on different computers.

In this example, runtime processing is caused by button 230 of FIG. 2 being interactively pressed (i.e. clicked) in an IDE, and new source logic 114 (or 210) was selected interactively or automatically. In runtime step 304, logic encoder 120 infers new fixed-size encoded logic 134 that represents new source logic 114 as discussed for FIG. 1.

In runtime step 305, multidimensional index 150 accepts fixed-size encoded logic 134 as a lookup key and automatically selects and returns result subset 160 of distinct fixed-size encoded logics 131-132 that represent relevant (i.e. similar) source logics in the corpus. Multidimensional index 150 selects only fixed-size encoded logics 131-132 because they are the few nearest neighbors to new fixed-size encoded logic 134, based on distance measurement as discussed for FIG. 1. For example in step 305, IndexIVFFlat's search( ) method accepts new fixed-size encoded logic 134 as input and returns result subset 160.

Runtime step 306 displays identifiers of documents for result subset 160. For example, step 306 may use fixed-size encoded logic 131 from result subset 160 as a lookup key that the corpus dictionary accepts to retrieve identifier 141 and, for example, display the title of identifier 141. Step 306 may display result subset 160 in a same way as recommendations 220 in FIG. 2.

For example if step 306 displays recommendations 220, then in runtime step 307, the user may interactively select (e.g. mouse click) one item in recommendations 220 to cause interactive selection of one fixed-size encoded logic in result subset 160, such as fixed-size encoded logic 131. Step 307 may use the URL of identifier 141 to retrieve (e.g. from another computer in the world wide web) and display the document in the corpus identified by identifier 141, which may be a reference document such as a blog (i.e. weblog) post, an online discussion thread, or a (e.g. Javadoc-generated) documentation webpage for any application program interface (API).

An API reference document may contain a declaration (i.e. signature) of a subroutine without a definition (i.e. body) of the subroutine. For example, source logic 111 may consists of only the signature, even if similar new source logic 114 contains both the signature and the definition.

Interactive step 307 may occur in an IDE and cause automatically displaying the reference document in the IDE or in a separate web browser that is outside of the IDE. Step 307 may be interactively repeated to display documents for other members of result subset 160.

4.0 Examplary Embodiment

This exemplary embodiment may implement computer 100 and uses a data dump of question-and-answer conversations from a discussion website. This embodiment only considers posts (i.e. comments posted online) that contain Python code. The dataset has 1.75 million Python posts with code from which this implementation derives document corpus D and its contained code corpus C. In a first step, extract all Python code snippets C from these posts D and generate the code embeddings e with a selected code model. To efficiently search the language model's embedding space E and find documents dj with related code cl, use the open source FAISS library to search M code samples related to $\Theta(q)$ in the embedding space E. The FAISS library is optimized to provide the fastest implementation of nearest neighbour search in a high-dimensional embedding space that contains a corpus of billions of vectors (i.e. multidimensional points). L2 distance may be used as a nearest neighbor metric. With the nearest neighbour search results, map the M nearest neighbours of $\Theta(q)$ in E back to their corresponding document in D. The mapping $\Psi$ can be implemented as a lookup table or as database entries.

The following example Algorithms 1 and 2 formalize the described implementation above. Algorithm 1 implements the build phase, and algorithm 2 implements the runtime phase as discussed earlier herein.

---

Algorithm 1 doc4code Training of $\Phi$

---

1: Input: Document Corpus D
2: Code Snippets C: extract code snippets from D and create lookup table $\Psi$
3: Create embeddings E: apply a given code model $\Theta$ to all snippets of C
4: Create a searchable Index of E with FAISS
5: Output: Trained recommender system $\Phi(q, D)$

---

---

Algorithm 2 doc4code Inference of $\Phi(q, D)$

---

1: Inputs: Code Snippet q, number of recommendations M, search index $\Phi(q, D)$, lookup table $\Psi$
2: Create code embedding e for user code snippet q with model $\Theta$
3: Conduct an M nearest neighbour search with FAISS on the trained index: $\Phi(q, D)_m = e_m$
4: Map $(e_1, \ldots, e_M)$ to the corresponding document d in D with $\Psi$
5: Output: $(r_1, \ldots, r_M)$

---

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
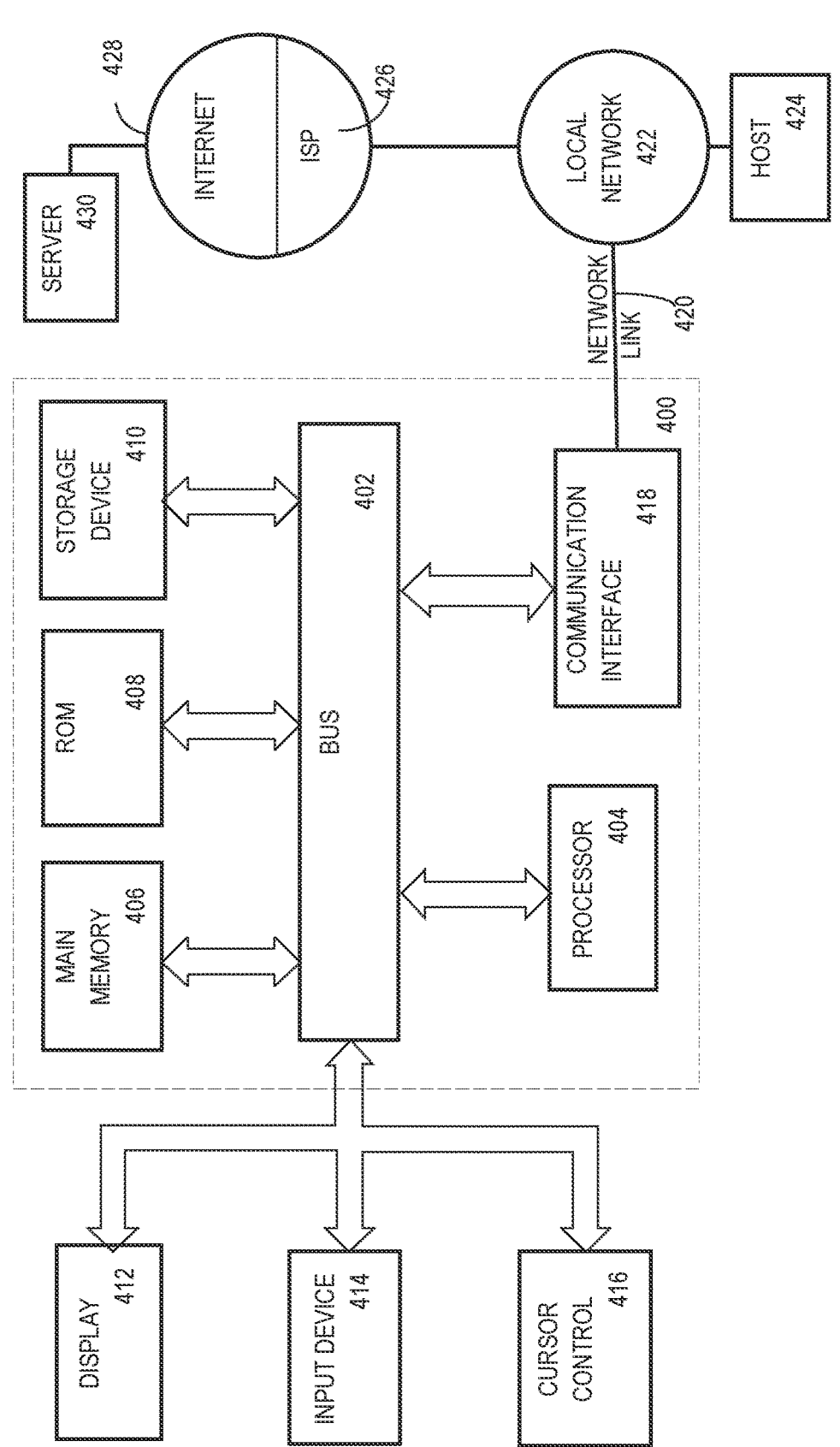
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
FIG. 5 is a block diagram that illustrates a basic software system that may be employed for controlling the operation of a computing system.

FIG. 5 is a block diagram of a basic software system 500 that may be employed for controlling the operation of computing system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Inferencing entails a computer applying the machine learning model to an input such as a feature vector to generate an inference by processing the input and content of the machine learning model in an integrated way. Inferencing is data driven according to data, such as learned coefficients, that the machine learning model contains. Herein, this is referred to as inferencing by the machine learning model that, in practice, is execution by a computer of a machine learning algorithm that processes the machine learning model.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
for each source logic in a plurality of source logics that include a particular source logic:
    storing an identifier of the source logic, and first inferring a distinct fixed-size encoded logic that represents the source logic;

generating a multidimensional index based on the distinct fixed-size encoded logics that represent the plurality of source logics;

second inferring a new fixed-size encoded logic that represents a new source logic that contains a syntax error;

selecting, based on the multidimensional index, a result subset of the distinct fixed-size encoded logics that represent the plurality of source logics that are nearest neighbors to the new fixed-size encoded logic, wherein the result subset of the distinct fixed-size encoded logics contains the distinct fixed-size encoded logic that represents the particular source logic;

first displaying, on a display of a computer, the identifiers for the result subset of the distinct fixed-size encoded logics that represent the plurality of source logics;

receiving, from an input device of the computer, an interactive selection, on the display of the computer, of the identifier of the particular source logic; and second displaying, on the display of the computer in response to said receiving, the particular source logic;

wherein the method is performed by one or more computers that includes said computer.

2. The method of claim 1 wherein:
the identifier of the particular source logic comprises a uniform resource locator (URL) of a webpage;
said second displaying comprises displaying the webpage;
said storing the identifier of the particular source logic comprises extracting the particular source logic from the webpage.

3. The method of claim 2 wherein the webpage contains a question and an answer that contains the particular source logic.

4. The method of claim 3 wherein said first displaying comprises displaying at least one selected from a group consisting of the question and a title of the webpage.

5. The method of claim 2 wherein the webpage contains application program interface (API) reference documentation.

6. The method of claim 1 wherein the particular source logic comprises a declaration of a subroutine without a definition of the subroutine.

7. The method of claim 1 wherein said selecting the result subset of the distinct fixed-size encoded logics is performed in an integrated development environment (IDE).

8. The method of claim 7 wherein said second displaying is performed inside or outside of the IDE.

9. The method of claim 1 further comprising at least one of:
interactively selecting the particular source logic that is less than an entire subroutine,
automatically selecting a lexical scope that is less than a source file, or
selecting the particular source logic that is multiple files.

10. The method of claim 1 wherein the plurality of source logics contains at least a million source logics.

11. One or more non-transitory computer-readable media storing instructions that, when executed by one or more processors, cause:
for each source logic in a plurality of source logics that include a particular source logic:
    storing an identifier of the source logic, and
    first inferring a distinct fixed-size encoded logic that represents the source logic;

generating a multidimensional index based on the distinct fixed-size encoded logics that represent the plurality of source logics;

second inferring a new fixed-size encoded logic that represents a new source logic that contains a syntax error;

selecting, based on the multidimensional index, a result subset of the distinct fixed-size encoded logics that represent the plurality of source logics that are nearest neighbors to the new fixed-size encoded logic, wherein the result subset of the distinct fixed-size encoded logics contains the distinct fixed-size encoded logic that represents the particular source logic;

first displaying, on a display of a computer, the identifiers for the result subset of the distinct fixed-size encoded logics that represent the plurality of source logics;

receiving, from an input device of the computer, an interactive selection, on the display of the computer, of the identifier of the particular source logic; and second displaying, on the display of the computer in response to said receiving, the particular source logic.

12. The one or more non-transitory computer-readable media of claim 11 wherein:

the identifier of the particular source logic comprises a uniform resource locator (URL) of a webpage;

said second displaying comprises displaying the webpage;

said storing the identifier of the particular source logic comprises extracting the particular source logic from the webpage.

13. The one or more non-transitory computer-readable media of claim 12 wherein the webpage contains a question and an answer that contains the particular source logic.

14. The one or more non-transitory computer-readable media of claim 13 wherein said first displaying comprises displaying at least one selected from a group consisting of the question and a title of the webpage.

15. The one or more non-transitory computer-readable media of claim 12 wherein the webpage contains application program interface (API) reference documentation.

16. The one or more non-transitory computer-readable media of claim 11 wherein the particular source logic comprises a declaration of a subroutine without a definition of the subroutine.

17. The one or more non-transitory computer-readable media of claim 11 wherein said selecting the result subset of the distinct fixed-size encoded logics is performed in an integrated development environment (IDE).

18. The one or more non-transitory computer-readable media of claim 17 wherein said second displaying is performed inside or outside of the IDE.

19. The one or more non-transitory computer-readable media of claim 11 wherein the instructions further cause at least one of:

interactively selecting the particular source logic that is less than an entire subroutine, automatically selecting a lexical scope that is less than a source file, or selecting the particular source logic that is multiple files.

20. The one or more non-transitory computer-readable media of claim 11 wherein the plurality of source logics contains at least a million source logics.

* * * * *